W. HAND.
Dumping Cart.

No. 113,293.  Patented Apr. 4, 1871.

WITNESSES.
John Becker.
Wm. H. C. Smith.

INVENTOR
W. Hand.
Per Munn & Co.
ATTORNEYS.

United States Patent Office.

WILLIAM HAND, OF PLAINFIELD, NEW JERSEY.

Letters Patent No. 113,293, dated April 4, 1871.

IMPROVEMENT IN DUMPING-CARTS.

The Schedule referred to in these Letters Patent and making part of the same.

*To all whom it may concern:*

Be it known that I, WILLIAM HAND, of Plainfield, in the county of Union and State of New Jersey, have invented a new and useful Improvement in Dumping-Carts; and I do hereby declare that the following is a full, clear, and exact description thereof which will enable others skilled in the art to make and use the same, reference being had to the accompanying drawing forming part of this specification.

This invention relates to a new and useful improvement in dumping-carts, whereby much time and labor are saved; and It consists in attaching the body of the cart to the axle, and in connecting the "hind-board" of the cart-body with the shafts, attaching the shafts to the body; and in fastening the body of the cart down to the shafts by a hook, which fastens automatically, the whole arranged and operating as hereinafter more fully described and specified.

In the accompanying drawing—

Similar letters of reference indicate corresponding parts.

Figure 1:
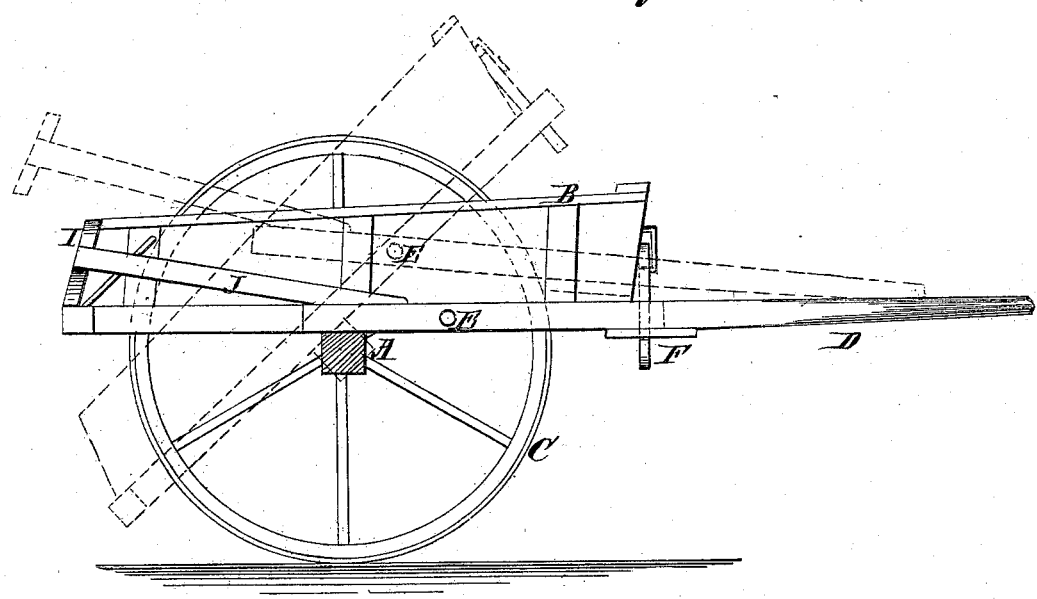
Figure 1 represents a vertical longitudinal section of the improved cart taken on the line *x x* of fig. 2.
Figure 2:
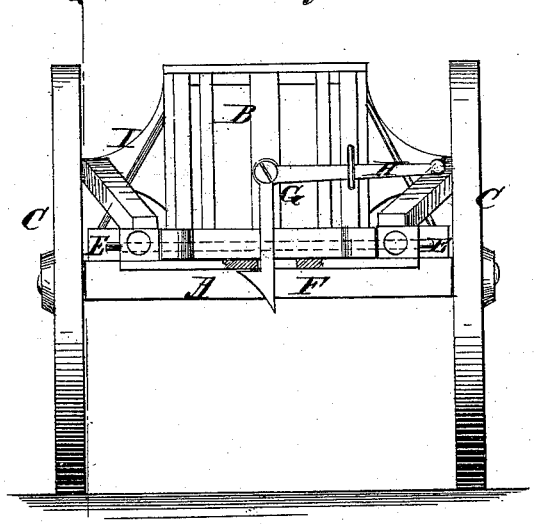
Figure 2 is a front end view of the cart.

A is the axle, and
B is the body of the cart.
C C are the wheels.
D represents the shafts or thills which are pivoted to the sides of the cart-body, as seen at E E.
F is a cross-piece, which connects the shafts and supports the front end of the body.
G is the fastening-hook, which is pivoted to the front end of the body, and works through a mortise in the cross-piece F, as seen in the drawing. The hook G is a lever bent at a right angle.

The horizontal portion H extends out past the front end of the body, so that the hook can be readily detached by the driver for dumping the cart.

I is the hind-board, which is connected with the shafts or thills D by a bar, J, on each side.

The top of this end-board leans inward, as seen in fig. 1, so that the rear end of the body leaves it readily when the cart is dumped.

The body being fast to the axle, the latter turns in the wheels when the body tips.

The position of the body and the axle, as well as that of the shafts and end-board, is seen in dotted lines in fig. 1.

In this position it will be seen that, when the horse is started forward after the cart is dumped, the power will be applied to the body at a point considerably above the axle, and the effect will be to draw the body down to a horizontal position, ready for reloading.

When the forward end of the body drops onto the cross-piece F the hook G catches under it automatically, and holds the body in position for loading and being moved to the desired point.

By this arrangement it will be seen that there is no time lost in taking out and putting in the hind-board; all that is necessary is to disengage the hook G. The body tips and is at once unloaded, and when the horse starts up it returns to its original position and fastens automatically.

In casting clay in brick-yards, or in embanking, &c., where a number of men are engaged in filling the carts, the saving of time by my improvement is a very important matter, and the advantages of the invention will be readily understood by all who are conversant with such operations.

Having thus described my invention,

I claim as new and desire to secure by Letters Patent—

1. Attaching the body of a dumping-cart to the axle, and the shafts or thills to the body of the cart, substantially as shown and described, and for the purposes set forth.

2. The shafts D and body B of the cart pivoted together in advance of the axle at E E, as and for the purpose specified.

3. Drawing upon the body of the cart to bring the body into position, substantially as described.

4. The right-angled hook G, having the projecting portion H, when applied to a dumping-cart, for the purpose specified.

5. The body and shafts pivoted together in front of the axle, the inwardly-inclined stationary tail-board on the body, the axle turning in the wheels, the connecting and supporting-bar, and the catch-lever, all combined for the purpose of forming an improved dumping-cart.

The above specification of my invention signed by me this 7th day of February, 1871.

WM. HAND.

Witnesses:
GEO. W. MABEE,
T. B. MOSHER.